United States Patent
Shirk et al.

(10) Patent No.: US 8,684,765 B2
(45) Date of Patent: Apr. 1, 2014

(54) CONNECTOR ASSEMBLY INCLUDING A LIGHT PIPE ASSEMBLY

(75) Inventors: Michael Eugene Shirk, Grantville, PA (US); Michael J. Phillips, Camp Hill, PA (US); David S. Szczesny, Hershey, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 1274 days.

(21) Appl. No.: 12/262,810

(22) Filed: Oct. 31, 2008

(65) Prior Publication Data
US 2010/0111476 A1    May 6, 2010

(51) Int. Cl.
*H01R 3/00*    (2006.01)
*G02B 6/10*    (2006.01)
*G02B 6/00*    (2006.01)
*F21V 7/04*    (2006.01)
*G09F 13/00*    (2006.01)
*H01L 33/00*    (2010.01)

(52) U.S. Cl.
USPC ........... 439/490; 385/146; 385/147; 362/551; 362/555

(58) Field of Classification Search
USPC ........... 385/146, 147; 439/490; 362/551, 555, 362/576
See application file for complete search history.

(56) References Cited

U.S. PATENT DOCUMENTS

| | | | |
|---|---|---|---|
| 4,887,876 A | 12/1989 | Fricke et al. | |
| 5,327,328 A | 7/1994 | Simms et al. | |
| 5,613,750 A | 3/1997 | Roe | |
| 5,876,239 A * | 3/1999 | Morin et al. | 439/490 |
| 5,915,993 A | 6/1999 | Belopolsky et al. | |
| 5,938,324 A | 8/1999 | Salmon et al. | |
| 6,095,851 A | 8/2000 | Laity et al. | |
| 6,113,422 A | 9/2000 | Somerville et al. | |
| 6,174,194 B1 | 1/2001 | Bleicher et al. | |
| 6,224,417 B1 | 5/2001 | Belopolsky et al. | |
| 6,264,499 B1 * | 7/2001 | Costello et al. | 439/490 |
| 6,283,786 B1 | 9/2001 | Margulis et al. | |
| 6,352,446 B2 * | 3/2002 | Ezawa et al. | 439/490 |
| 6,463,204 B1 | 10/2002 | Ati | |
| 7,249,966 B2 | 7/2007 | Long | |
| 7,421,184 B2 | 9/2008 | Long | |
| 7,621,773 B2 * | 11/2009 | Bright et al. | 439/490 |
| 2001/0039140 A1 | 11/2001 | Fasold et al. | |
| 2005/0063647 A1 | 3/2005 | Thornton et al. | |
| 2005/0254257 A1 | 11/2005 | Long | |
| 2005/0254772 A1 | 11/2005 | Long et al. | |
| 2007/0253168 A1 | 11/2007 | Miller | |

OTHER PUBLICATIONS

US 7,094,096, 08/2006, Long (withdrawn)

* cited by examiner

*Primary Examiner* — Uyen Chau N Le
*Assistant Examiner* — John M Bedtelyon

(57) ABSTRACT

A connector assembly that includes a receptacle connector and a light pipe. The connector is configured to receive a removable device inserted along a longitudinal axis. The connector has a side surface that extends along a plane defined by the longitudinal axis and a vertical axis that is perpendicular to the longitudinal axis. The connector includes a ledge and a positive stop that project laterally outward from the side surface. The ledge has a ledge surface that joins the side surface. The light pipe extends substantially along the longitudinal axis. The light pipe has an inward-facing surface that is substantially flat throughout and abuts the side surface of the connector. The light pipe rests upon the ledge surface and the positive stop is positioned on the side surface to block the light pipe from moving in at least one direction along the longitudinal axis.

19 Claims, 5 Drawing Sheets

CONNECTOR ASSEMBLY INCLUDING A LIGHT PIPE ASSEMBLY

BACKGROUND OF THE INVENTION

The invention relates generally to connector assemblies having light pipes, and more particularly to connector assemblies adapted to hold the light pipes in predetermined positions.

Connector assemblies may be configured to receive a pluggable or removable device and establish a communicative connection between the device and another device or system. For example, a connector that is configured to receive a small form-factor (SFP) pluggable transceiver may be mounted to a circuit board. In order to ensure that the connection has been properly made between the pluggable transceiver and the mounted connector, light pipe assemblies may be used. The light pipe assembly transmits light flashed by an indicator, such as a light emitting diode (LED), that is located on the circuit board. The light is transmitted to a remote location that is viewable or detectable by an operator to notify the operator that the connection has been properly made.

U.S. Patent Application Publication No. 2005/0254257 to Long describes one connector assembly that incorporates a light pipe assembly. The connector assembly includes an internal connector that is mounted to a circuit board and a light pipe assembly that directly engages the connector. The light pipe assembly includes engagement members such as lugs, hooks, or other projections that are inserted into and couple with holes or openings in the connector. However, the engagement members described in the Long publication are small pieces that may break during assembly or require additional costs for molding. Furthermore, the engagement members may require precise manipulation of the connector assembly's parts while assembling.

Thus, there is a need for connector assemblies having light pipes that may be easier and less costly to assemble than known connector assemblies.

BRIEF DESCRIPTION OF THE INVENTION

In one embodiment, a connector assembly that includes a receptacle connector and a light pipe is provided. The connector is configured to receive a removable device inserted along a longitudinal axis. The connector has a side surface that extends along a plane defined by the longitudinal axis and a vertical axis that is perpendicular to the longitudinal axis. The connector includes a ledge and a positive stop that project laterally outward from the side surface. The ledge has a ledge surface that joins the side surface. The light pipe extends substantially along the longitudinal axis. The light pipe has an inward-facing surface that is substantially flat throughout and abuts the side surface of the connector. The light pipe rests upon the ledge surface and the positive stop is positioned on the side surface to block the light pipe from moving in at least one direction along the longitudinal axis.

Optionally, the light pipe may include a beam portion that curves and forms into a base portion. The beam portion may extend along the longitudinal axis and rest upon the ledge surface. The base portion may extend along the vertical axis and be blocked by the positive stop. Also, the light pipe may be a first light pipe and the connector assembly may also include a second light pipe that is stacked upon the first light pipe and extends along the side surface of the connector. Furthermore, in some embodiments, the light pipe does not include any projections that directly couple to the connector.

In another embodiment, a connector assembly that includes a receptacle connector and a light pipe (LP) assembly is provided. The receptacle connector is configured to receive a removable device inserted along a longitudinal axis. The connector has a pair of side surfaces that extend along a plane defined by the longitudinal axis and a vertical axis that is perpendicular to the longitudinal axis. The side surfaces face away from each other in opposite directions. Each side surface has a ledge and a positive stop that project laterally outward therefrom. Each ledge has a ledge surface that joins the side surface. The light pipe (LP) assembly is configured to engage the connector. The LP assembly has at least one pair of light pipes that are spaced apart from each other and extend substantially along the longitudinal axis. Each light pipe has an inward-facing surface. The inward-facing surface is substantially flat throughout and abuts a corresponding side surface of the connector. The light pipe rests upon the ledge surface and the positive stop is positioned on the side surface to block the light pipe from moving in at least one direction along the longitudinal axis.

Optionally, the pair of light pipes may be joined together through a bridge portion. Also, there may be first and second pairs of light pipes. The light pipes of the first and second pairs may include a display end portion that is located remotely from the connector. The light pipes may be shaped such that the display end portions are co-planar with each other.

In another embodiment, a receptacle assembly is provided and includes a connector cage that has a plurality of cavities for receiving removable devices and a plurality of connector assemblies positioned within corresponding cavities. Each connector assembly includes a receptacle connector and a light pipe (LP) assembly is provided. The receptacle connector is configured to receive a removable device inserted along a longitudinal axis. The connector has a pair of side surfaces that extend along a plane defined by the longitudinal axis and a vertical axis that is perpendicular to the longitudinal axis. The side surfaces face away from each other in opposite directions. Each side surface has a ledge and a positive stop that project laterally outward therefrom. Each ledge has a ledge surface that joins the side surface. The light pipe (LP) assembly is configured to engage the connector. The LP assembly has at least one pair of light pipes that are spaced apart from each other and extend substantially along the longitudinal axis. Each light pipe has an inward-facing surface. The inward-facing surface is substantially flat throughout and abuts a corresponding side surface of the connector. The light pipe rests upon the ledge surface and the positive stop is positioned on the side surface to block the light pipe from moving in at least one direction along the longitudinal axis.

Optionally, at least two cavities may be stacked upon each other with a spacing therebetween. The pair of light pipes may extend between the two cavities within the spacing. In addition, at least two connector assemblies may be positioned side-by-side within the cage.

DETAILED DESCRIPTION OF THE INVENTION

Figure 1:
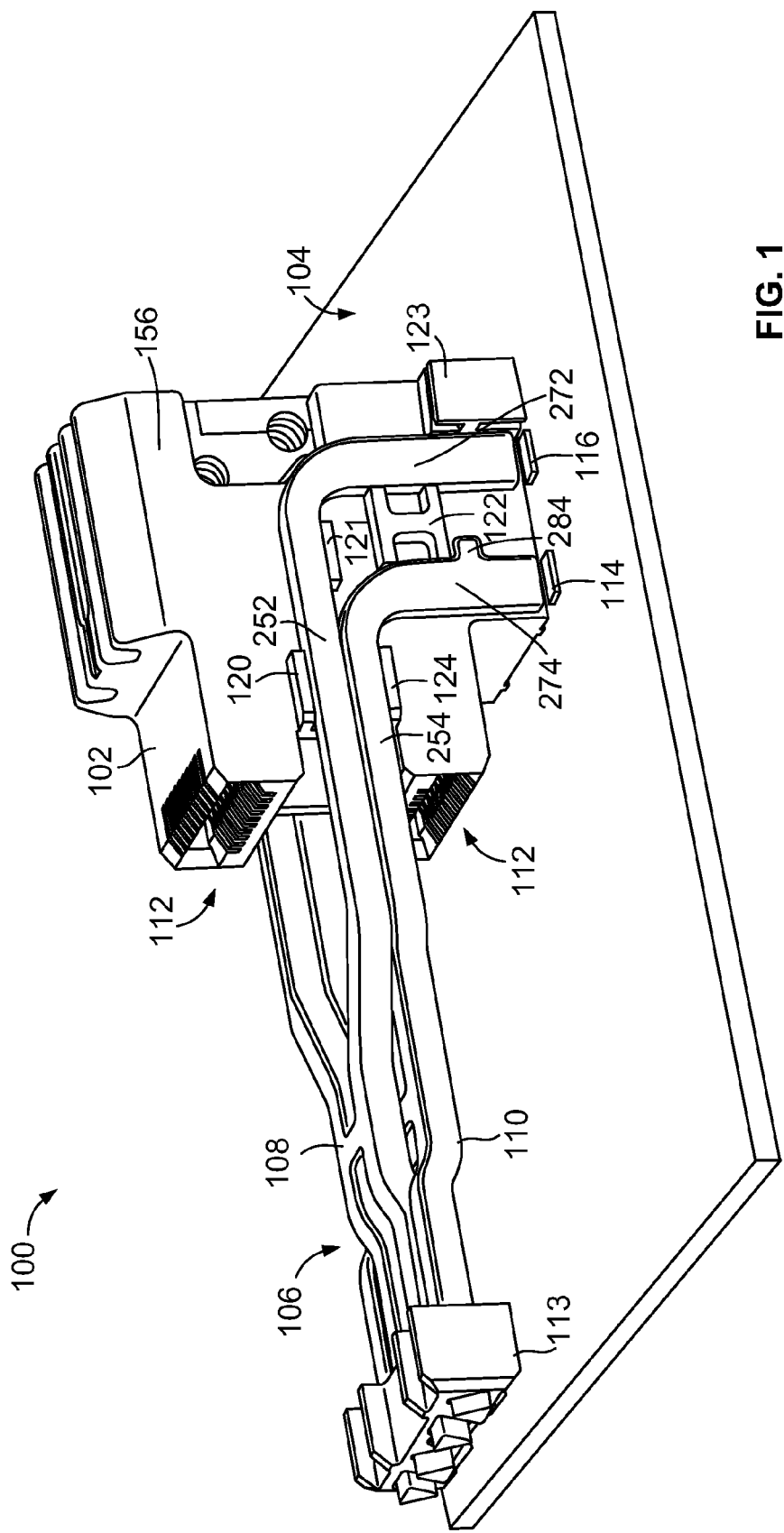
FIG. 1 is a perspective view of a connector assembly formed in accordance with one embodiment.

FIG. 1 is a perspective view of a connector assembly 100 formed in accordance with one embodiment. The connector assembly 100 includes a receptacle connector 102 that is mounted onto and electrically connected to a substrate, which is shown in FIG. 1 as a circuit board 104. The connector assembly 100 also includes a light pipe (LP) assembly 106 that includes a light pipe (LP) structure 108 and another LP structure 110. The connector assembly 100 may also include a cap 113 that may facilitate holding the LP structures 108 and 110 in a predetermined arrangement. The connector 102 includes one or more ports 112 that are each configured to mate with a removable device (not shown), such as a small-form factor (SFP) pluggable transceiver. However, embodiments described herein are not limited to electrical connectors but may also include optical or optoelectronic connectors. As will be discussed in greater detail below, in some embodiments, the connector 102 includes a plurality of alignment members, such as alignment members 120-124 shown in FIG. 1, that project from a corresponding side 156 of the connector 102 and are configured to hold at least one light pipe, which will be discussed in greater detail below. The light pipe(s) may have a continuously even surface that abuts and extends along the side 156. Furthermore, other embodiments described herein include a receptacle assembly 300 (shown in FIG. 7) that incorporates one or more of the connector assemblies 100.

In the illustrated embodiment, the light pipe structures 108 and 110 transmit light that may originate from light emitting diodes (LEDs), such as the LEDs 114 and 116. The light is transmitted from the LEDs 114 and 116 to a remote location that is viewable or detectable by an operator. The light indicates a condition of the electrical and/or optical connection between the removable device and the connector 102. The condition may relate to a quality of transmission between the removable device and the one or more ports 112. For example, the status indication may be a colored light (e.g., green for high quality transmission, red for poor transmission or to indicate a disconnection). The status indication may be a light that flashes or blinks at a predetermined frequency.

While the connector assembly 100 is described herein with particular reference to a vertically stacked electrical connector, it is to be understood that the benefits herein described are also applicable to other connectors, such as optical or optoelectronic connectors, and to connectors having alternative configurations than the embodiments shown in the Figures. For example, the receptacle connector may have only one port 112 or a plurality of ports 112 that are arranged side-by-side. Likewise, although the connector assembly 100 shown in FIG. 1 illustrates two light pipe structures 108 and 110 each having two separate light pipes (discussed below), the benefits described herein may be applied to light pipe structures having more than two light pipes or only one light pipe. In addition, the removable device is not limited to pluggable devices, but may include devices that must be fastened to the connector 102. As such, the following description is provided for purposes of illustration, rather than limitation, and is but one potential application of the subject matter herein.

Figure 2:
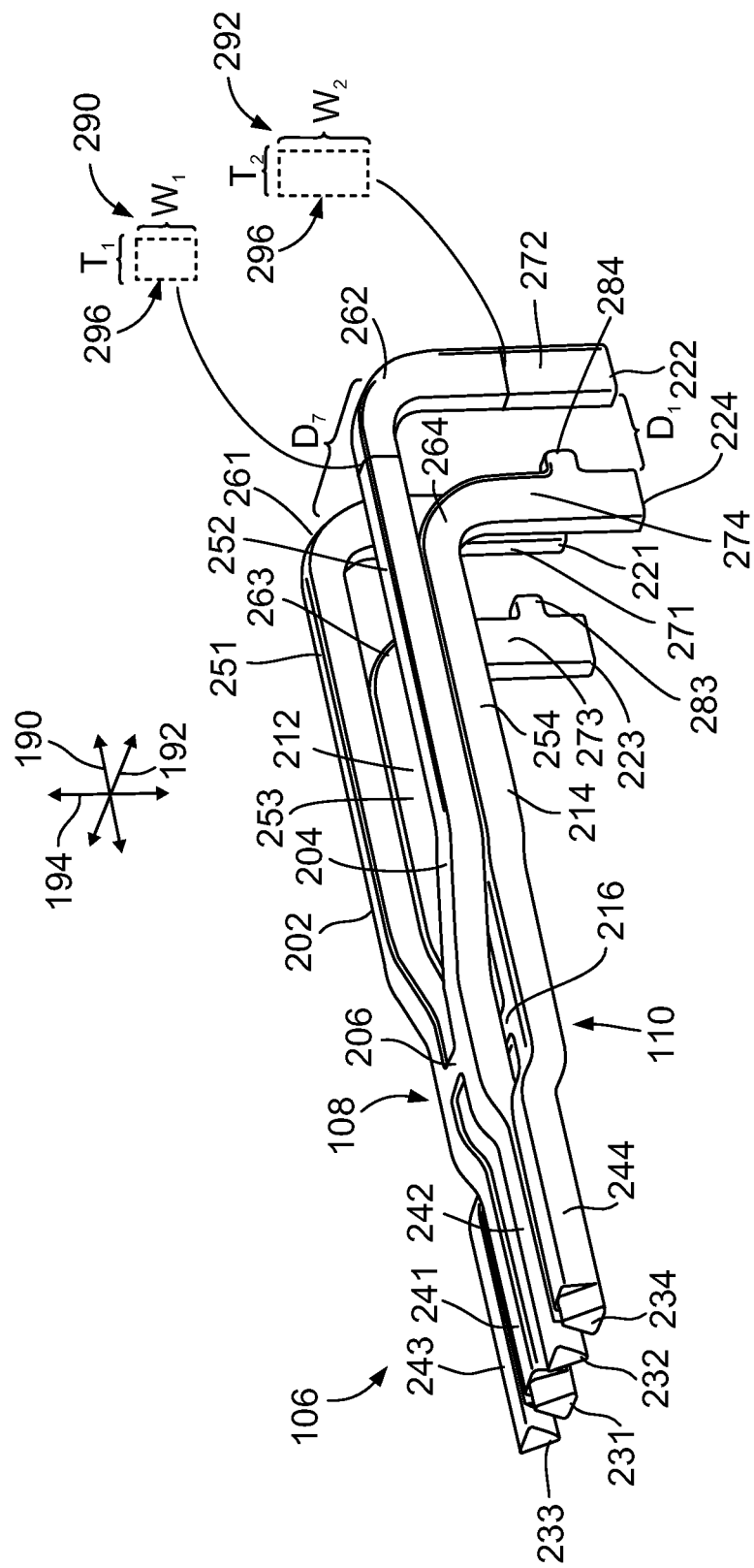
FIG. 2 is a perspective view of a light pipe (LP) assembly that may be used with the connector assembly shown in FIG. 1.

FIG. 2 is a perspective view of the LP assembly 106, which includes the LP structures 108 and 110. The connector assembly 100 (FIG. 1), including the LP assembly 106, is described with respect to a longitudinal axis 190, a horizontal or lateral axis 192, and a vertical axis 194. In the illustrated embodiment, the LP structures 108 and 110 are separate components that are held together when the connector assembly 100 is fully assembled. However, in alternative embodiments, the LP assembly 106 may be integrally formed by, for example, molding the LP structures 108 and 110 as one unit or by coupling the LP structures 108 and 110 together using an adhesive or fastening mechanism. Furthermore, the LP structures 108 and 110 may include a light transmitting material that is resiliency flexible. As such, the LP structures 108 and 110 may be flexed or manipulated into various positions during the construction of the connector assembly 100. As shown in FIG. 2, the LP structures 108 and 110 are in relaxed conditions. When the connector assembly 100 is fully constructed, the LP structures 108 and 110 may be in substantially relaxed conditions or, alternatively, the LP structures 108 and 110 may be flexed to facilitate holding the LP assembly 106 in position with respect to the connector 102.

The LP structure 108 may include a pair of light pipes 202 and 204 and a bridge portion 206 that joins the light pipes 202 and 204, and the LP structure 110 may include a pair of light pipes 212 and 214 and a bridge portion 216 that joins the light pipes 212 and 214. Each light pipe 202, 204, 212, and 214 extends between an input end 221-224, respectively, and a display face 231-234, respectively. In the illustrated embodiment, the light pipes 202, 204, 212, and 214 transmit light between the corresponding input ends and display faces. As such, the input ends 221-224 are typically positioned proximate to an LED, such as the LED's 114 and 116 shown in FIG. 1, and the display faces 231-234 are located remotely from the connector 102 (e.g., in a position that is viewable or detectable by an operator).

The LP structures 108 and 110 may be shaped in various configurations to transmit light to the remote location. An example of one such configuration is illustrated in FIG. 2. In the illustrated embodiment, the LP structures 108 and 110 have similar configurations and the LP structure 108 is directly stacked upon the LP structure 110 such that the light pipes 202 and 204 extend along and abut the light pipes 212 and 214, respectively. In alternative embodiments, LP structures 108 and 110 may have a stacked relationship, but not be proximate to each other. Also, in alternative embodiments, the LP structures 108 and 110 may not have similar shapes and/or a stacked relationship. Also shown in FIG. 2, the light pipes 202, 204, 212, and 214 may have a display end portion 241-244, respectively, that include the corresponding display faces 231-234. In the illustrated embodiment, the light pipes 202, 204, 212, and 214 are shaped such that the end portions 241-244 are co-planar with each other and the display faces 231-234 are aligned with each other along the lateral axis 192. However, in alternative embodiments, the display faces 231-234 may be in other arrangements.

The light pipes 202, 204, 212, and 214 also include respective beam portions 251-254, curved portions 261-264, and base portions 271-274. In the illustrated embodiment, the light pipes 202 and 212 extend alongside each other and are spaced apart from the light pipes 204 and 214, respectively, a distance $D_7$. As such, the beam portions 251-254 may extend in a substantially common direction along the longitudinal axis 190, and the beam portions 251 and 253 may be equally spaced apart from the beam portions 252 and 254, respectively, along the lateral axis 192.

Although the following description is with specific reference to the light pipes 204 and 214, the description may similarly be applied to the light pipes 202 and 212. The beam portions 252 and 254 extend alongside each other for a distance until the beam portion 254 reaches the curved portion 264. The curved portion 264 curves into and forms the base portion 274. The beam portion 252 continues to the curved portion 262, which curves and forms into the base portion 272. The base portions 272 and 274 include the input ends 222 and 224, respectively. In the illustrated embodiment, the base portions 272 and 274 extend in a substantially vertical direction and perpendicular to the beam portions 252 and 254, respectively. Furthermore, the base portions 272 and 274 may be spaced apart from each other a distance $D_1$ along the longitudinal axis 190.

However, in alternative embodiments, the paths taken by the light pipes 204 and 214 are not similar but change as desired. For example, the curved portions 262 and 264 may curve in different directions such that the respective base portion 272 and 274 do not extend parallel to each other. Also, the light pipes 204 and 214 may curve or turn about additional alignment features other than alignment features 120-124 (FIG. 1) or about alternative alignment features that have different positions than the positions of the alignment features 120-124.

Also shown in FIG. 2, the beam portion 252 of the light pipe 204 may have a cross-section 290 and the corresponding base portion 272 may have a cross-section 292. The cross-sections 290 and 292 are substantially rectangular in FIG. 2, however, the cross-section 290 and 292 may have various shapes (e.g., oval or circular, triangular, or another polygon). The light pipe 204 at the cross-section 290 has a thickness $T_1$ and a width $W_1$ and at the cross-section 292 a thickness $T_2$ and a width $W_2$. In the illustrated embodiment, the width $W_2$ is greater than the width $W_1$, but the thicknesses $T_1$ and $T_2$ may be substantially equal. Furthermore, as shown with respect to the cross-sections 290 and 292, the light pipe 204 has an inward-facing surface 296. In the illustrated embodiment, the surface 296 is continuously even with respect to the side surface 157 of the side 156 (shown in FIG. 3). For example, the surface 296 may extend smoothly along and complement the shape of the side 156. The surface 296 may not include any projections, such as hooks or tabs, that extend inwardly toward the connector 102 and directly engage or couple to a hole of the connector 102. In one embodiment, the surface 296 may be substantially flat, i.e., a planar surface that extends linearly along the side 156. However, in alternative embodiments, the light pipe 204 may have various dimensions/or and include projections that directly engage the connector 102.

Also shown in FIG. 2, the light pipes 212 and 214 may have grip extensions 283 and 284 that project outwardly from the respective base portions 273 and 274 toward the respective base portions 271 and 272 (i.e., along the longitudinal axis 190). The grip extensions 283 and 284 may maintain the continuously even surfaces 296. As will be described in greater detail below, the grip extensions 283 and 284 facilitate holding the LP assembly 106, and specifically the LP structure 110, in a substantially stationary position with respect to the connector 102.

Figure 3:
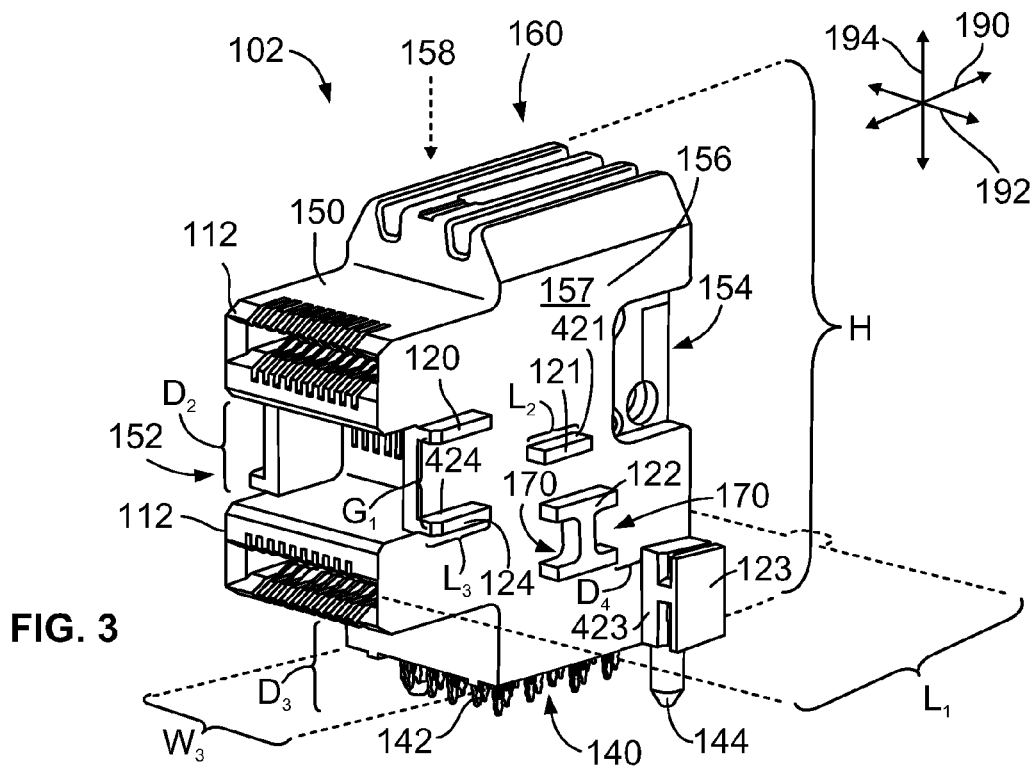
FIG. 3 is a perspective view of one side of a connector that may be used in the connector assembly shown in FIG. 1.
Figure 4:
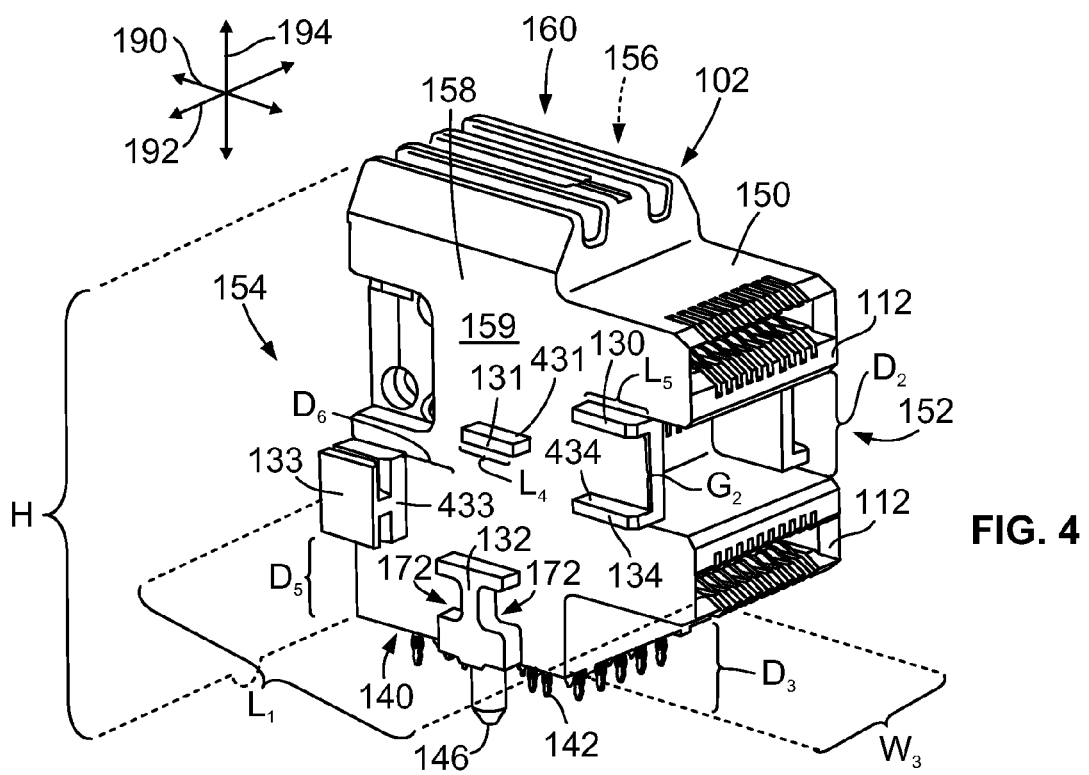
FIG. 4 is a perspective view of another side of the connector shown in FIG. 4.

FIGS. 3 and 4 illustrate different side perspective views of the connector 102, which is also described with respect to the longitudinal axis 190, the lateral axis 192, and the vertical axis 194. When the removable device (not shown) is inserted into one or more ports 112, the removable device is moved along the longitudinal axis 190. The connector 102 has a length $L_1$ that extends along the longitudinal axis 190, a width $W_3$ that extends along the lateral axis 192, and a height H that extends along the vertical axis 194. The connector 102 includes a housing or body 150 that has a forward-facing end 152, a rearward-facing end 154, sides 156 and 158, a top portion 160, and a mounting face 140. The forward-facing end 152 includes the ports 112. The ports 112 may be spaced apart from each other a distance $D_2$ and the lower port 112 may be separated from the circuit board 104 a distance $D_3$. The ports 112 may include one or more contacts or terminals that are configured to mate with a circuit board or other electrical component from, for example, a pluggable device. Furthermore, the mounting face 140 may include a plurality of contact tails 142 that project out from the mounting face 140 and are configured to be inserted into corresponding holes (not shown) of the circuit board 104 (FIG. 1) to establish an electrical connection. In addition, the mounting face 140 may include posts 144 (FIG. 3) and 146 (FIG. 4) that project outwardly therefrom. The posts 144 and 146 are configured to be inserted into corresponding holes (not shown) of the circuit board 104 for supporting and coupling the connector 102 to the circuit board 104.

The sides 156 and 158 may face substantially opposite directions away from each other and along the lateral axis 192. As shown in FIGS. 3 and 4, the sides 156 and 158 have side surfaces 157 and 159, respectively. The side surfaces 157 and 159 extend parallel to a plane formed by the longitudinal axis 190 and the vertical axis 194. The sides 156 and 158 may include the plurality of alignment members 120-124 and 130-134, respectively. The alignment members 120-124 and 130-134 cooperate in holding the LP structures 108 and 110 in predetermined positions. Each alignment member 120-124 and 130-134 may be configured to support the LP structures 108 and 110 such that a portion of the corresponding LP structure may rest upon the alignment member and/or may be configured to prevent the LP structures 108 and 110 from moving in at least one longitudinal direction or upward from a resting position. In the illustrated embodiment, the alignment members 120-124 include ledges 121 and 124, positive stops 120 and 123, and I-shaped member 122. The alignment members 130-134 include ledges 131 and 134, positive stops 130 and 133, and I-shaped member 132. However, in alternative embodiments, there may be fewer or greater alignment members.

As one example, with respect to FIG. 3, the alignment members 120-124 may project laterally outwardly from the side surface 157 and may be arranged on the side 156 to hold one or more light pipes (discussed below). For example, the positive stop 123 may be proximate to or along a corner of the side 156 formed by the mounting face 140 and the rearward-facing end 154. The positive stop 123 may have a forward-facing surface 423. The I-shaped member 122 may be positioned higher than or above the positive stop 123 and toward a center of the side 156. The I-shaped member 122 may be substantially I-shaped and have recesses 170 that open up to the forward-facing end 152 and the rearward-facing end 154. The I-shaped member 122 is separated or spaced apart from the positive stop 123 a distance $D_4$ along the longitudinal axis 190. The distance $D_4$ is sized to snugly fit the light pipe 204 when the light pipe 204 is engaged with the connector 102. For example, when the light pipe 204 is engaged with the connector 102, the positive stop 123 and the I-shaped member 122 prevent movement in both directions along the longitudinal axis 190.

Furthermore, the positive stop 120 and the ledge 124 may be vertically aligned with one another and positioned proximate to the forward-facing end 152. The positive stop 120 and the ledge 124 may be separated from each other by a gap $G_1$. The ledge 121 may be substantially above the positive stop 123 and behind the positive stop 120 and the ledge 124 (i.e., closer to the rearward-facing end 154). The positive stop 120 and the ledges 121, 124 may extend along the longitudinal axis 190. The ledge 121 has a length $L_2$, and the positive stop 120 and the ledge 124 have a length $L_3$. The lengths $L_2$ and $L_3$ are generally configured to support the light pipes when the connector assembly 100 is fully constructed. The ledge 121 may also include a ledge surface 421 and the ledge 124 may have a ledge surface 424. The ledge surfaces 421 and 424 may join the side surface 157. In the illustrated embodiment, the ledge surfaces 421 and 424 are substantially perpendicular to the side surface 157 and extend parallel to the longitudinal axis 190.

Likewise, as shown in FIG. 4, the side 158 has the side surface 159 that includes the plurality of alignment members 130-134. The alignment members 130-134 project laterally outward from the side surface 159 and are arranged on the side 158 to hold one or more light pipes (discussed below). For example, the positive stop 133 may be proximate to or flush with the rearward-facing end 154 and a distance $D_5$ away from the mounting face 140 along the vertical axis 194. The I-shaped member 132 may be positioned lower than the positive stop 133 and toward a center of the side 156. In one embodiment, the I-shaped member 132 is flush with the mounting face 140. The I-shaped member 132 may be substantially I-shaped and have recesses 172 that open up to the forward-facing end 152 and the rearward-facing end 154. The I-shaped member 132 is separated or spaced apart from the positive stop 133 a distance $D_6$ along the longitudinal axis 190.

Furthermore the positive stop 130 and the ledge 134 may be vertically aligned with one another and positioned proximate to the forward-facing end 152. The positive stop 130 and the ledge 134 may be separated from each other by a gap $G_2$. The ledge 131 may be substantially above the positive stop 133 and behind the positive stop 130 and the ledge 134 (i.e., closer to the rearward-facing end 154). The positive stop 130 and the ledges 131, 134 extend along the longitudinal axis 190. The ledge 131 has a length $L_4$, and the positive stop 130 and the ledge 134 have a length $L_5$. The lengths $L_4$ and $L_5$ are generally configured to support the light pipes. Also, the ledge 131 may also include a ledge surface 431 and the ledge 134 may have a ledge surface 434. The ledge surfaces 431 and 434 may join the side surface 159. In the illustrated embodiment, the ledge surfaces 431 and 434 are substantially perpendicular to the side surface 159.

As shown in FIGS. 3 and 4, the alignment members 120-124 (FIG. 3) and the alignment members 130-134 (FIG. 4) have similar arrangements on the sides 156 and 158, respectively. However, the positive stop 123 is positioned proximate to the mounting face 140 and the positive stop 133 is positioned a distance $D_5$ away from the mounting face 140. The positive stop 133 may have a forward-facing surface 433. Also, the I-shaped member 122 is positioned away from the mounting face 140 and the I-shaped member 132 is positioned proximate to or flush with the mounting face 140. In one embodiment, the alternating arrangement of the alignment members 123, 122 and 133, 132 allows the connector 102 to be positioned side-by-side with another connector that has a common configuration in a receptacle assembly. Furthermore, as shown, extra support may be provided to the post 144 (FIG. 3) by the material used to shape the positive stop 123. Likewise, extra support may be provided to the post 146 (FIG. 4) by the material used to shape the I-shaped member 132. As such, the posts 144 and 146 may have different longitudinal positions along the mounting face 140. In addition, the alignment members 120-124 and 130-134 may still provide sufficient support for holding the corresponding light pipes.

Figure 5:
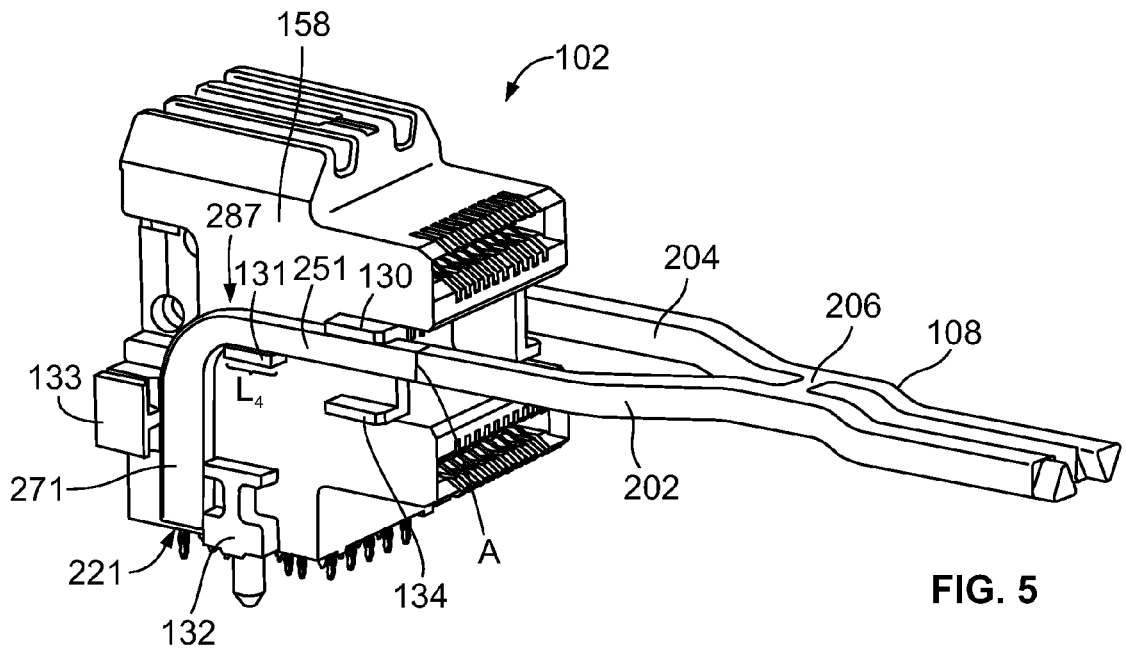
FIG. 5 is a side perspective view of the connector as shown in FIG. 4 having one light pipe (LP) structure coupled thereto.
Figure 6:
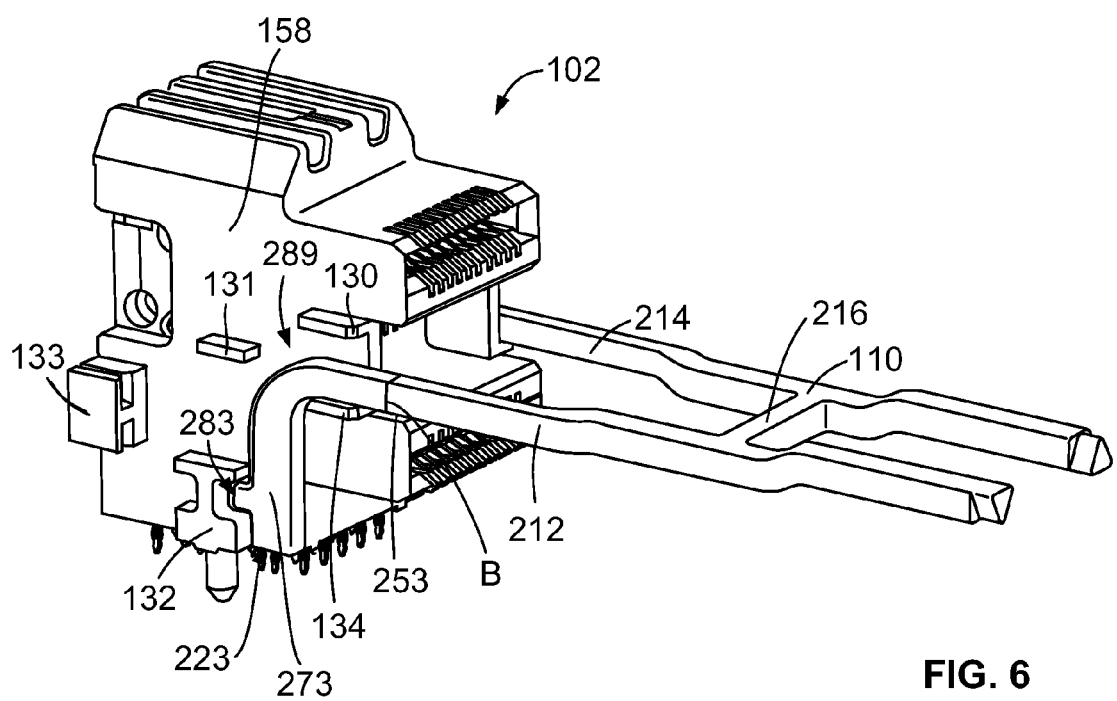
FIG. 6 is a side perspective view of the connector as shown in FIG. 4 having another light pipe (LP) structure coupled thereto.

FIGS. 5 and 6 illustrate perspective views of how the connector 102 may separately hold the LP structures 108 and 110, respectively. As discussed above, embodiments of the connector assembly 100 (FIG. 1) may include the LP assembly 106 (FIG. 2) or may include only one LP structure as shown in FIGS. 5 and 6. Furthermore, alternative embodiments may include one or more light pipes on only one side of the connector 102. With reference to FIG. 5, the light pipes 202 and 204 of the LP structure 108 are joined together by the bridge portion 206. To couple the LP structure 108 to the connector 102, the light pipes 202 and 204 may be flexed outwardly (i.e., away from each other) so that the light pipes 202 and 204 may clear the alignment members 130-134 and 120-124 (FIG. 1), respectively. As such, the LP structure 108 may approach the connector 102 from a plurality of directions.

The dimensions and shape of the light pipes 202 and 204 and the positions and shapes of the alignment members 130-134 and 120-124 are such that when the light pipes 202 and 204 are engaged with the connector 102, the LP structure 108 is held in a substantially stationary position. As used herein, a "substantially stationary position" includes the LP structure (s) and/or light pipe(s) being in a rigidly fixed position with respect to the connector 102 during operation, but also includes the LP structure(s) and/or light pipe(s) being generally confined in a predetermined position such that slight sliding or movement is tolerated. For example, in some embodiments, even though the LP structure(s) and/or light pipes(s) are slightly moveable, the display faces 231-234 (FIG. 1) are always viewable or detectable by an operator when the connector assembly 100 is in operation. In the illustrated embodiment, the LP structure may not be removed from the connector 102 without substantial force or bending of the corresponding light pipes. However, in alternative embodiments, the LP structure(s) and/or light pipe(s) may be allowed to substantially move or slide in a predetermined manner.

Returning to FIG. 5, when the LP structure 108 is engaged with the connector 102, the beam portion 251 rests upon the ledge surface 431 (FIG. 4) and extends below the positive stop 130. The length $L_4$ of the ledge 131 in the longitudinal direction may provide additional balance and stability for the beam portion 251. Furthermore, in the engaged position, the base portion 271 extends between the I-shaped member 132 and the positive stop 133. As such, the positive stop 130 and the ledge 131 prevent or block movement of the light pipe 202 along the vertical axis 194 (FIG. 2) (both up and down direction), and the I-shaped member 132 and the positive stop 133 prevent or block movement along the longitudinal axis 190 (FIG. 2) (both forward and rearward directions). Furthermore, the light pipe 202 is restrained from inadvertently moving away from the side 158 because of the light pipe 204, which is joined to the light pipe 202 at the bridge portion 206. As shown, the alignment members 130-134 do not grip the light pipe 202. However, in alternative embodiments, one or more of the alignment members 130-134 may wrap around or grip the light pipe 202.

The light pipe 204 may similarly engage the alignment members 120-124 on the side 156 (FIG. 3) as described above with respect to the light pipe 202 and the alignment members 130-134.

With respect to FIG. 6, the light pipes 212 and 214 of the LP structure 110 may also be flexed outwardly (i.e., away from each other) so that the light pipes 212 and 214 may clear the alignment members 130-134 and 120-124 (FIG. 5), respectively. When the LP structure 110 is engaged with the connector 102, the beam portion 253 rests upon the ledge surface 434 (FIG. 4) of the ledge 134 and the base portion 273 extends alongside the I-shaped member 132. In the illustrated embodiment, the grip extension 283 is held within the recess 172 of the I-shaped member 132. Thus, the light pipe 212 is prevented from moving in the longitudinal direction by the ledge 134 and the I-shaped member 132, and the grip extension 283 that is held within the recess 172 prevents the light pipe 212 from moving in the vertical direction. Likewise, the light pipe 214 may similarly engage the alignment members 120-124 on the side 156 (FIG. 3) as described above with respect to the light pipe 212 and the alignment members 130-134. As such, the LP structures 108 and 110 may be separately held in substantially stationary positions by the connector 102.

Although FIGS. 5 and 6 illustrate specific positions and dimensions of the alignment members 130-134, the alignment members may have other positions and dimensions in alternative embodiments. For example, the positions and dimensions may be configured such that the corresponding light pipes may be manipulated to clear the alignment members and snap into the substantially stationary position.

Also shown in FIGS. 5 and 6, the light pipes 202 and 212, respectively, may have a connector portion 287 and 289, respectively, that extends along and engages the connector 102. The connector portions 287 and 289 are generally the portions of the light pipes 202 and 212, respectively, that directly engage the connector 102. More specifically, the connector portion 287 extends from a location A on the light pipe 202 to the input end 221. The connector portion 289 extends from a location B on the light pipe 212 to the input end 223. The connector portions 287 and 289 may include all or parts of the respective beam portions, curved portions, and base portions. Furthermore, the connector portions 287 and 289 include the continuously even surface 296 (FIG. 2).

Returning to FIG. 1, as described above, the connector 102 is also configured to hold the LP assembly 106 in a substantially stationary position. In the illustrated embodiment, the beam portions 252 and 254 extend alongside each other between the positive stop 120 and the ledge 124. The I-shaped member 122 facilitates holding both of the light pipes 214 and 204 in substantially stationary positions. Furthermore, as shown in FIG. 1, the I-shaped member 122 is positioned on the side 156 such that the grip extension 284 engages the underside of the I-shaped member 122. Thus, the connector 102 may hold the LP structures 108 and 110 separately or may hold the LP structures 108 and 110 jointly in the LP assembly 106.

Figure 7:
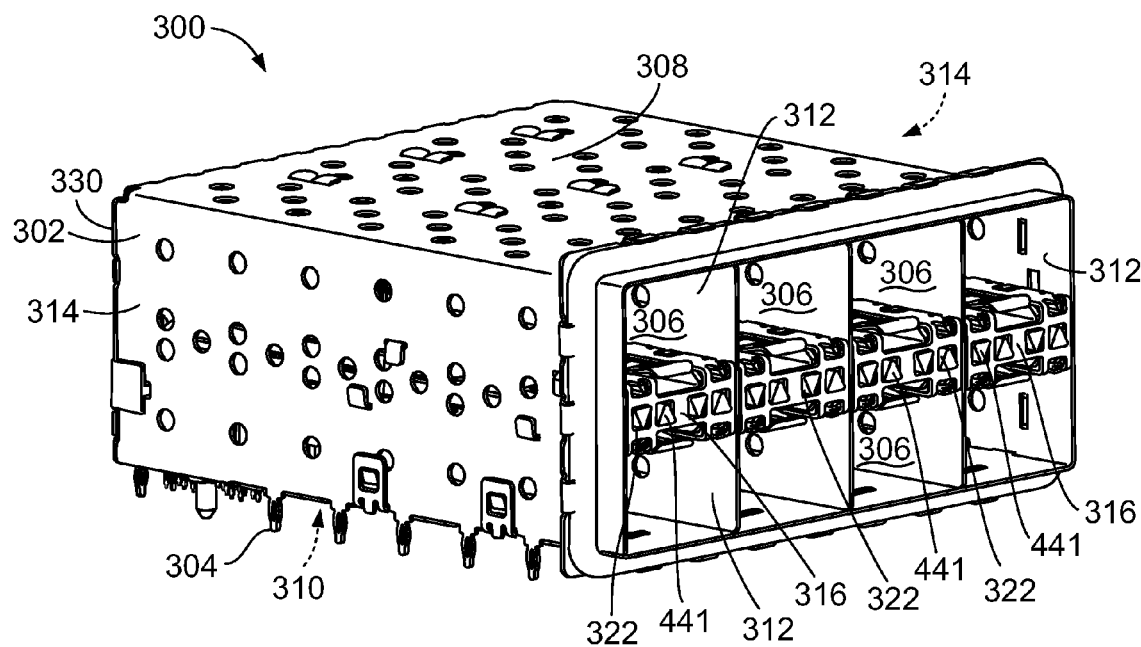
FIG. 7 is a perspective view of a receptacle assembly formed in accordance with one embodiment.

FIG. 7 is a front perspective view of a receptacle assembly 300 according to another embodiment. While the receptacle assembly 300 is described herein with particular reference to a vertically stacked receptacle assembly, it is to be understood that the benefits herein described are also applicable to other receptacle assemblies in alternative embodiments. The receptacle assembly 300 includes a connector cage 302 that is shaped to receive a plurality of removable devices (not shown), such as SFP pluggable transceivers. The connector cage 302 is a shielding connector cage in one embodiment.

For example, the connector cage 302 includes, or is formed from, a conductive material such as a metal. The connector cage 302 and/or one or more components of the connector cage 302 may be stamped and formed from a sheet of metal. In another example, the connector cage 302 includes, or is formed from, a non-conductive material, such as a polymer, that is at least partially plated with a conductive material. The connector cage 302 may include a plurality of grounding pins 304 that mechanically and electrically couple the connector cage 302 with a substrate, such as the circuit board 104 shown in FIG. 1.

The connector cage 302 includes a plurality of walls. For example, the connector cage 302 includes a top wall 308, an opposing bottom wall 310, a plurality of interior side walls 312, a plurality of exterior side walls 314 and a rear wall 330. The connector cage 302 may also include one or more center members, or center plates 316. Each of the center plates 316 extends between one of the exterior side walls 314 and one of the interior side walls 312 or between a pair of the interior side walls 312 in the illustrated embodiment. The center plates 316 may be mounted in the connector cage 302 so the center plates 316 extend from one side wall to a neighboring side wall. The center plates 316 may couple neighboring side walls 312 and 314 or neighboring side walls 312 and 312. The center plates 316 include apertures 322 that permit light transmitted through LP assemblies, such as LP assembly 406 shown in FIG. 8. The apertures 322 may provide openings through which display faces 441 of the corresponding LP assembly 406 (shown in FIG. 8) may project through.

The connector cage 302 defines a plurality of cavities 306. The cavities 306 are shown in FIG. 7 as being arranged in pairs of cavities 306, with the cavities in each pair being separated by one of the center plates 316. The connector cage 302 receives a removable device in one or more of the cavities 306. Each of the cavities 306 can receive a respective removable device which can be placed into communication with a corresponding receptacle connector that is housed within the connector cage 302. In one embodiment, one or more of the display faces 441 emit an indicator light through corresponding apertures 322 in the center plates 316 to indicate whether a removable device is in communication with the corresponding receptacle connector.

Figure 8:
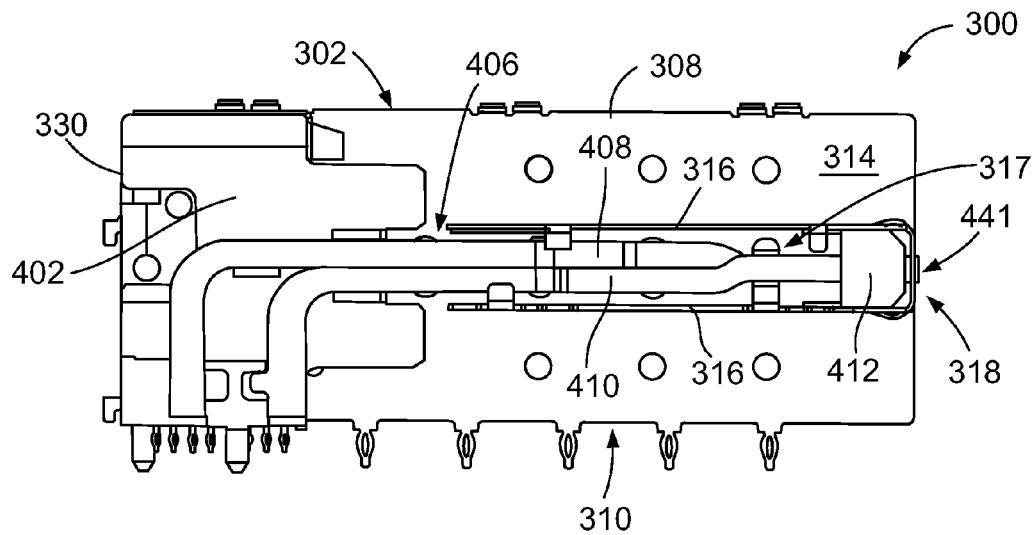
FIG. 8 is an exposed side view of the receptacle assembly shown in FIG. 7.

FIG. 8 is a side view of the receptacle assembly 300 with one of side walls 314 removed. The receptacle assembly 300 includes a receptacle connector 402 and the LP assembly 406 housed in the connector cage 302. The connector 402 and LP assembly 406 may have similar features as described above with respect to the connector 102 and the LP assembly 106. The center plates 316 each define an interior spacing 317 between pairs of cavities 306 (FIG. 7). The spacing 317 is partially enclosed by a plurality of the side walls 312 and 314 (FIG. 7) on opposing sides of the center plate 316. The spacing 317 accommodates one or more light pipe (LP) structure 408 and 410, which may have light pipes as described above with respect to the LP structures 108 and 110. For example, the LP structures 408 and 410 may pass through the spacing 317 from a location that is proximate to an LED (not shown) to a location that is proximate to a mating interface 318 of the connector cage 302. A cap 412 may couple to the center plates 316 and/or the connector cage 302 to facilitate holding the display faces 441 in a predetermined position.

It is to be understood that the above description is intended to be illustrative, and not restrictive. As such, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly comprising:
    a receptacle connector configured to receive a removable device inserted along a longitudinal axis, the connector having a side surface that extends along a plane defined by the longitudinal axis and a vertical axis that is perpendicular to the longitudinal axis, the connector including a ledge and a positive stop that project laterally outward from the side surface, the ledge having a ledge surface that joins the side surface, the connector having a mounting face that is configured to be mounted to a circuit board, the mounting face extending laterally inward from the side surface; and
    a light pipe extending substantially along the longitudinal axis, the light pipe having an inward-facing surface, the inward-facing surface abutting the side surface of the connector and being substantially flat along the side surface, the ledge surface facing away from the circuit board in a direction along the vertical axis and being located between the mounting face and the light pipe, wherein the light pipe directly engages and rests upon the ledge surface when gravity pulls the light pipe along the vertical axis toward the circuit board, the positive stop being positioned on the side surface to block the light pipe from moving in at least one direction along the longitudinal axis, wherein light propagating through the light pipe propagates over the ledge surface when the gravity is pulling the light pipe toward the circuit board.

2. The connector assembly in accordance with claim 1 wherein the light pipe includes a beam portion that curves and forms into a base portion, the beam portion extending along the longitudinal axis and resting upon the ledge surface when the gravity is pulling the light pipe toward the circuit board and the base portion extending along the vertical axis, the positive stop directly engaging the base portion to block the light pipe from moving in the at least one direction along the longitudinal axis.

3. The connector assembly in accordance with claim 1 wherein the light pipe is a first light pipe and the connector assembly further comprises a second light pipe stacked upon the first light pipe and extending along the side surface of the connector.

4. The connector assembly in accordance with claim 3 wherein the ledge is a first ledge and the ledge surface is a first ledge surface, the connector further comprises a second ledge that projects laterally outward from the side surface and has a second ledge surface that directly interfaces with the second light pipe, wherein the first and second ledge surfaces face in opposite directions along the vertical axis, the first and second light pipes being held together between the first and second ledge surfaces.

5. The connector assembly in accordance with claim 1 wherein the inward-facing surface along the side surface extends parallel to the plane that is defined by the vertical and longitudinal axes.

6. The connector assembly in accordance with claim 1 wherein the positive stop is a first positive stop and the connector also includes a second positive stop that projects laterally outward from the side surface when the removable device is not engaged to the connector, the first and second positive stops configured to block the light pipe from moving in both directions along the longitudinal axis.

7. The connector assembly in accordance with claim 1 wherein the connector assembly includes a light pipe (LP) structure having the light pipe, the LP structure being movable relative to the connector, wherein the LP structure does not include any projections that extend from the inward-facing surface toward the side surface and directly couple to the connector.

8. The connector assembly in accordance with claim 1 wherein the ledge and the positive stop are separate structures that are spaced apart from each other along the side surface.

9. The connector assembly in accordance with claim 1 wherein the light pipe has a connector portion that transmits light therethrough for communicating information to an operator during operation, the connector portion including the inward-facing surface that abuts the side surface of the connector along an interface and a mounting surface that extends away from the interface and the connector and faces generally along the vertical axis, the mounting surface directly engaging and resting upon the ledge surface when gravity pulls the light pipe along the vertical axis toward the circuit board.

10. The connector assembly in accordance with claim 1 wherein the connector is configured to be mounted to a circuit board, the ledge surface being located a first height away from the circuit board and the positive stop being located at most a second height away from the circuit board, wherein the first height is greater than the second height.

11. The connector assembly in accordance with claim 1 wherein the connector assembly includes a light pipe (LP) structure that includes the light pipe, the LP structure being movable relative to the connector, wherein the LP structure does not include a coupling element that is coupled to the light pipe and that extends from the inward-facing surface toward the connector and directly couples the LP structure and the connector.

12. A connector assembly comprising:
    a receptacle connector configured to receive a removable device inserted along a longitudinal axis, the connector having a pair of side surfaces that extend along a plane defined by the longitudinal axis and a vertical axis that is perpendicular to the longitudinal axis, the side surfaces facing away from each other in opposite directions, each of the side surfaces having a ledge and a positive stop that project laterally outward therefrom, each of the ledges having a ledge surface that joins the corresponding side surface, the receptacle connector having a mounting face that extends between the pair of side surfaces and is configured to be mounted to a circuit board; and a light pipe (LP) assembly configured to engage the connector, the LP assembly having at least one pair of light pipes that are spaced apart from each other and extend substantially along the longitudinal axis, the receptacle connector being disposed between the light pipes of the at least one pair, each of the light pipes having an inward-facing surface that abuts one of the pair of side surfaces, each of the inward-facing surfaces being substantially flat along the corresponding side surface, each of the ledge surfaces facing away from the circuit board in a direction along the vertical axis and being located between the mounting face and the corresponding light pipe, wherein each of the light pipes directly engages and rests upon the corresponding ledge surface when gravity pulls the corresponding light pipe along the vertical axis toward the circuit board, the positive stops being positioned on the corresponding side surfaces to block the corresponding light pipes from moving in at least one direction along the longitudinal axis, wherein light propagating through each of the light pipes propagates over the corresponding ledge surface when the gravity is pulling the corresponding light pipe toward the circuit board.

13. The connector assembly in accordance with claim 12 wherein each of the light pipes includes a beam portion that curves and forms into a base portion, the beam portion extending along the longitudinal axis and resting upon the corresponding ledge surface and the base portion extending along the vertical axis, the corresponding positive stop directly engaging the corresponding base portion to block the corresponding light pipe from moving in the at least one direction along the longitudinal axis.

14. The connector assembly in accordance with claim 12 wherein the pair of light pipes are joined together through a bridge portion, the light pipes and the bridge portion being part of a single continuous molded structure.

15. The connector assembly in accordance with claim 12 wherein the at least one pair of light pipes includes first and second pairs of light pipes, the first and second pairs of light pipes stacked upon each other.

16. The connector assembly in accordance with claim 12 wherein the inward-facing surfaces along the corresponding side surfaces extend parallel to the plane that is defined by the vertical and longitudinal axes.

17. The connector assembly in accordance with claim 12 wherein the positive stop is a first positive stop and each of the side surfaces has a second positive stop that projects laterally outward from the corresponding side surface when the removable device is not engaged to the connector, the first and second positive stops of each of the side surfaces configured to block the corresponding light pipe from moving in both directions along the longitudinal axis.

18. The connector assembly in accordance with claim 12 wherein the LP assembly is movable relative to the connector, the LP assembly not including a coupling element that is coupled to and extends from one of the inward-facing surfaces toward the connector and that directly couples the corresponding light pipe and the connector.

19. The connector assembly in accordance with claim 12 wherein the light pipes are joined to each other and separated by a connector-receiving space where the connector is located during operation, the connector-receiving space being enlarged to receive the connector when the light pipes are resiliently flexed away from each other, the light pipes being separated by a first separation distance when the light pipes are in a first condition and separated by a greater second separation distance when the light pipes are in a second condition, wherein the ledges and/or the positive stops prevent the light pipes being mounted to the connector for operation in the first condition, the ledges and/or the positive stops being cleared by the light pipes in the second condition to mount the light pipes to the connector for operation, wherein the light pipes are in the first condition during operation of the connector assembly.

\* \* \* \* \*